July 2, 1963  H. B. KOLM, JR  3,095,906
FLOW CONTROL SERVO VALVE WITH DYNAMIC LOAD PRESSURE FEEDBACK
Filed March 5, 1959

INVENTOR.
Harvard B. Kolm Jr.
BY
Popp and Sommer
Attorneys.

United States Patent Office 3,095,906
Patented July 2, 1963

3,095,906
FLOW CONTROL SERVO VALVE WITH DYNAMIC LOAD PRESSURE FEEDBACK
Harvard B. Kolm, Jr., East Aurora, N.Y., assignor to Moog Servocontrols, Inc., a corporation of New York
Filed Mar. 5, 1959, Ser. No. 797,487
2 Claims. (Cl. 137—625.62)

This invention relates to improvements in electrically operated, fluid handling, servo valves, and more particularly to a flow control servo valve with high frequency pass load pressure feedback. Such an improved valve may be called a dynamic pressure feedback servo valve.

In U.S. Patent No. 2,767,689 there is disclosed an electrohydraulic flow control servo valve which produces a valve spool displacement proportionate to an electrical signal input, irrespective of load reaction.

Also known is an electrohydraulic pressure-flow control servo valve which controls spool displacement jointly by the electrical signal input and by the reaction of the load with which the valve is associated. Such a pressure-flow valve contributes effective damping in dynamically loaded servo systems. However, the valve responds to static as well as dynamic load pressures so that the valve spool tends to move for any and all load reactions. Such a valve is disclosed in the pending application of Lewis H. Geyer, Serial No. 797,488, filed March 5, 1959, and entitled Pressure-Flow Servo Valve, now Patent No. 2,964,059.

The primary object of the present invention is to provide a dynamic pressure feedback servo valve which contributes damping in dynamically loaded servo systems while retaining the desirable system static stiffness characteristics of non-load-pressure sensitive servo valves. Both of these desirable characteristics are made possible by using load pressure feedback through a frequency sensitive network. Essentially, the improved valve has the high pressure gain characteristics of a flow control valve in the steady state and the load sensitive characteristics of a pressure-flow valve at higher frequencies. The frequency sensitive network approximates a high pass, first-order filter, and has a corner frequency which is typically set somewhere between an octave and a decade below the resonant frequency of the load. The frequency determining parameters of this filter may be varied to suit particular system requirements. The sensitivity of flow to load pressure which occurs due to pressure feedback may be tailored to provide the equivalent damping required for a particular load.

Other objects and advantages will be apparent from the following detailed description and accompanying drawing in which.

Figure 1:
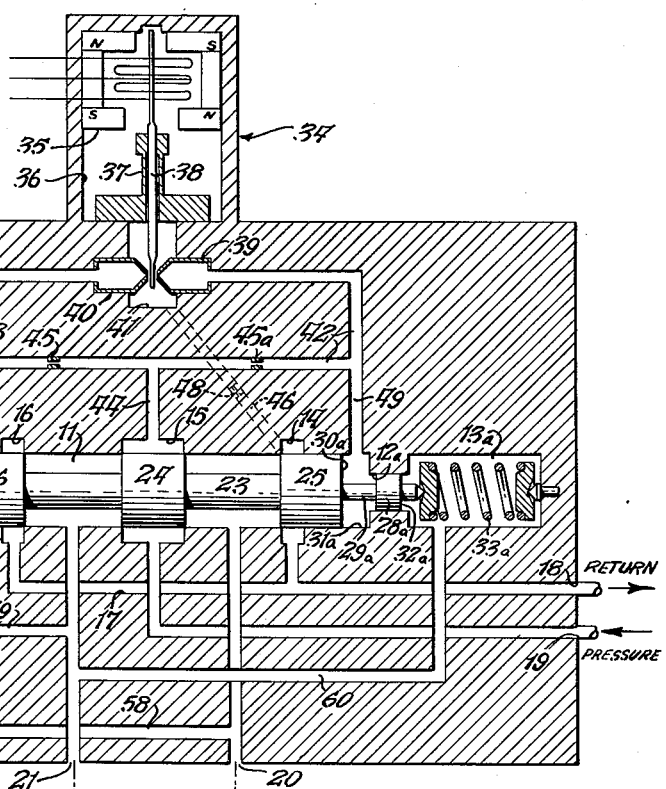
FIG. 1 is a vertical central sectional view through a dynamic pressure feedback electrohydraulic servo valve of preferred construction and embodying the present invention and illustrating the internal construction of the valve in a more or less diagrammatic manner and with the valve spool in a neutral position.

Referring to the drawing, the valve is shown as having a body 10 internally formed with a horizontally elongated central chamber 11 connected at opposite ends severally through reduced bores 12, 12a with end chambers 13, 13a, respectively. All of these chambers and the intermediate reduced bores are cylindrical and coaxial. The body wall of the central chamber 11 is shown as provided with three annular grooves 14, 15 and 16 at axially spaced intervals therealong. The right groove 14 is shown as communicating with a return or drain port 18 and the left groove 16 via a fluid channel 17 is also shown as communicating with the drain port 18. The center groove 15, somewhat longer axially than the other two, is shown as communicating with a pressure port 19. The portion of the central chamber 11 between the grooves 14 and 15 is shown as being in communication with an actuating port 20. The portion of the central chamber 11 between the grooves 15 and 16 is shown as being in communication with a second actuating port 21.

The return port 18 and pressure port 19 are connected with any suitable hydraulic system (not shown). The actuating ports 20 and 21 are connected with external hydraulic machinery indicated schematically as a piston and cylinder actuator and represented by the numeral 22.

Thus, the servo valve has inlet, outlet and actuating ports for supplying a receiving fluid to and from the actuator 22 to be actuated.

A valve spool 23 is slidably arranged in the central chamber 11 and is shown as having a central lobe 24 and two end lobes 25 and 26. The central lobe 24 has an axial length corresponding to that of the central groove 15. The end lobes 25 and 26 are longer axially than the width of the end grooves 14 and 16. When the valve spool 23 is in its centered or neutral position shown in FIG. 1, the central lobe 24 covers the center groove 15, and the end lobes 25 and 26 cover the end grooves 14 and 16, respectively, with the inner ends of these end lobes opposite the inner end of these end grooves. In this centered or neutral position of the valve spool 23, neither actuating port 20 or 21 has communication with either the pressure port 19 or the drain port 18.

Similar piston heads 28 and 28a are shown severally as being slidably arranged in the intermediate reduced bores 12 and 12a, respectively. These piston heads are arranged at opposite ends of the valve spool and are axially spaced outwardly therefrom. Each piston head is shown as being integrally connected to the corresponding end of the valve spool 23 by a stem, such stem being indicated at 29 for the piston head 28 and at 29a for the other piston head 28a. The portion of the chamber 11 between the inner end face of the left piston head 28 and the outer end face 30 of the left end lobe 26 provides a hydraulic drive chamber 31. A similar drive chamber 31a, is provided between the inner end face of the right piston head 28a and the outer end face 30a of the right end lobe 25. The inner end of the left end chamber 13 is closed by the outer end face 32 of the left piston head 28, and similarly the inner end of the right end chamber 13a is closed by the outer end face 32a of the right piston head 28a.

A helical compression spring 33 is shown arranged in the left end chamber 13 and suitably operatively interposed between the fixed outer end wall of this chamber and the outer end face 32 of the movable left piston head 28. A similar spring 33a is shown as arranged in the right end chamber 13a and between the fixed outer wall thereof and the outer end face 32a of the movable right piston head 28a.

Means are provided for producing a pressure differential in the spool drive chambers 31 and 31a so as to drive the spool 23 hydraulically. Such means are shown as including an electrohydraulic amplifier first stage, represented generally by the numeral 34, which produces an output pressure differential proportionate to an electrical signal input.

The preferred electrohydraulic amplifier 34 is shown as having a solenoid or torque motor 35 arranged in a compartment 36 in the valve body, and adapted to move a pressure regulator member 38. A pair of nozzles 39 and 40 are arranged in a separate compartment 41 which serves as a sump chamber. The end portion of the pressure regulator member 38 remote from the torque motor 35 extends between the discharge openings of the nozzles 39 and 40 and in a variably spaced relation thereto. The pressure regulator member 38 intermediate its ends is mounted on a flexure tube 37. The position of the lower or flapper portion of the pressure regulator member with respect to the discharge openings of the nozzles 39 and 40 provides variable annular orifices which develop a pressure differential within the nozzle chambers or interiors.

It will be observed that the solenoid or torque motor 35 is isolated from the sump chamber 41 into which the nozzles 39 and 40 discharge fluid. Such a dry solenoid type of electrohydraulic amplifier is more fully described as to construction and operation in the patent application of William C. Moog, Jr., Serial No. 560,573, filed January 23, 1956, and entitled Fluid Control Valve in which a mechanical motion is transmitted from a dry region to a pressurized fluid filled region. Instead of the preferred dry solenoid type of first stage amplifier shown, an immersed solenoid type may be employed such as is fully described in the aforementioned Patent No. 2,767,689. Both such types of electrohydraulic amplifiers are of the balanced nozzle design and regardless of which type is employed in the practice of the present invention, provide an output pressure differential proportionate to the electrical signal input to the solenoid or torque motor 35. Such hydraulic amplifiers provide a high force level output push-pull hydraulic drive with completely frictionless operation and excellent dynamic performance while requiring very little signal input current.

The construction of each of the electrohydraulic amplifiers referred to above may be herein described as comprising a polarized electrical force motor including spaced pole pieces, permanent magnet means and electromagnetic means associated with the pole pieces, and having for its armature and extending between the pole pieces a flapper means arranged to move with mechanical spring restraint, the centering force gradient of which is substantially cancelled by the decentering force gradient of the permanent magnet means, and a pair of fixed nozzles in spaced relation to different surface portions of the flapper to provide variable orifices for discharging fluid, variations in the position of the flapper relative to the nozzles resulting in a differential pressure between the nozzle chambers, the flapper moving to reduce to zero the summation of the moments acting upon it.

Means are provided for supplying the electrohydraulic amplifier 34 with fluid derived from the hydraulic system connected to the pressure and return ports 19 and 18, respectively. As shown, the fluid feed is by means of independent branch fluid feed channels 42 and 43 severally communicating at one end with the chambers or interiors of the nozzles 39 and 40, respectively. At their other ends the channels 42 and 43 communicate with a main fluid feed channel 44 which leads to the annular pressure groove 15, in turn connected to the pressure port 19. The channels 43 and 42 are shown severally as having restrictions 45 and 45a, respectively, therein so that fluid supplied to the nozzles is at a lower pressure than the hydraulic system supply pressure applied to the port 19. A fluid drain channel 46 having a restriction 48 therein is shown as placing the sump chamber 41 in communication with the annular drain groove 14, in turn connected to the return port 18.

Means are shown for applying the pressure differential created by the nozzles 39 and 40 to the spool drive chambers 31 and 31a so that this pressure differential can be utilized to drive hydraulically the valve spool 23. Such means are shown as including fluid channels 49 and 50. The channel 49 at one end communicates with the fluid feed branch channel 42 on the downstream side of the restriction 45a therein, and the opposite end of the channel 49 communicates with the right spool drive chamber 31a. The fluid channel 50 is shown as communicating with the fluid feed branch channel 43 on the downstream side of the restriction 45 therein, and the other end of this channel 50 communicates with the left drive chamber 31. Thus, the respective output pressures developed by the nozzles 39 and 40 are applied severally to the end faces 30a and 30, respectively, at opposite ends of the valve spool 23.

In accordance with the principles of the present invention, the pressure differential across the load, as sensed in the actuating ports or load lines 20 and 21 connected to the actuator 22, is fed back to the valve spool 23 through a frequency sensitive network in such manner that the load pressure differential is in opposition to the hydraulic drive on the valve spool due to the pressure differential in the drive chambers 31 and 31a. As shown, such frequency sensitive network comprises pressure drop producing means including orifice or restrictor 51 providing a hydraulic resistance, and also comprises resiliently restrained fluid volume transfer means including a spring retained piston or accumulator 52 providing a hydraulic capacitance. This piston 52 is shown as being slidably arranged in a vertically elongated cylindrical chamber 53 formed in the valve body 10. Two helical compression springs 54 and 55 are shown severally as being arranged on opposite sides of the piston 52. The upper spring 54 is suitably operatively interposed between the upper closed end of the cylinder 53 and the upper end face of the piston 52. The lower spring 55 is suitably operatively interposed between the lower closed end of the cylinder 53 and the lower end face of the piston 52. Adjacent its upper end and above the piston 52, the cylinder 53 is interiorly connected by the channel 56 to the left end chamber 13. Adjacent its lower end and below the piston 52, the cylinder 53 is interiorly connected by the channel 58 to the actuating port or load line 20. A channel 59 having the orifice or restriction 51 therein, is shown as establishing communication between the channel 56 and the left actuating port or load line 21. A channel 60 is shown as establishing communication between the left actuating port or load line 21 and the right end chamber 13a.

Thus, the spring retained piston 52 is operatively arranged in a feedback line, consisting of the channels 56 and 58, which connects the left end chamber 13 with the right actuating port 20. The channel 60 also serves as a feedback line which connects the other or left actuating port 21 with the other or right end chamber 13a. The channel 59 having the restricted orifice 51 therein serves as a hydraulic resistance which is shunted in effect across the aforementioned feedback lines.

The spring retained piston 52 forming a hydraulic capacitance and the restricted orifice 51 forming a hydraulic resistance in the network shown and described, provide a hydraulic high-pass filter which feeds back to the valve spool 23 load pressure differential directly at high frequencies but lesser proportions at lower frequencies. Thus, the network is operative to pass the load pressure variations more effectively above than below a predetermined frequency.

The network has an approximate transfer function relating output pressure differential ($\Delta P_0$) to input pressure differential ($\Delta P_i$) of the following form:

$$\frac{\Delta P_0}{\Delta P_i} = \frac{\tau S}{1+\tau S} \quad (1)$$

where $\Delta P_0$ = feedback pressure differential between end chambers 13 and 13a $\Delta P_i$ = Load pressure differential between actuating ports 20 and 21

$\tau = RC$ (R being hydraulic resistance and C hydraulic capacitance)

$S$ = Laplace operator = $j\omega = 2\pi\sqrt{-1}f$ $(j=\sqrt{-1})$; $\omega=2\pi f$;

$f$ = frequency in c.p.s. of sinusoidally varying load pressure differential

Figure 2:
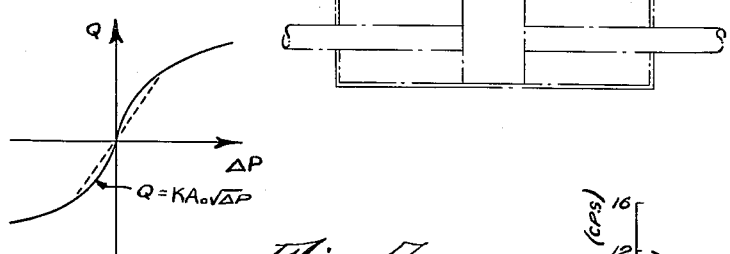
FIG. 2 is a curve depicting the relationship between flow through and pressure applied to a restricted orifice.

The hydraulic resistance may be either of the orifice or viscous type. An orifice resistance is highly non-linear or non-proportionate as illustrated in FIG. 2, while a viscous resistance is linear but extremely temperature sensitive. For reasons of simplicity an orifice resistance 51 is preferred since its non-linear behavior is not important provided it performs its function.

A hydraulic resistance can be defined as a hydraulic damping element in which flow through the element is related to the pressure across the element. The effective resistance of such an element is the ratio of the pressure to the flow, such that for an orifice, resistance can be expressed as:

$$R = \frac{\Delta P}{Q} \quad (2)$$

but $$Q = KA_0\sqrt{\Delta P} \simeq \frac{1}{2}\left(\frac{KA_0}{P_0}\right)\Delta P$$

so $$R \simeq \frac{2P_0}{KA_0}$$

where $R$ = hydraulic resistance (orifice damping effect) $\left(\frac{\#\text{-sec.}}{\text{in.}^5}\right)$ $\Delta P$ = instaneous pressure drop across orifice $\left(\frac{\#}{\text{in.}^2}\right)$ $Q$ = instantaneous flow through orifice $\left(\frac{\text{in.}^3}{\text{sec.}}\right)$ $K$ = orifice flow coefficient $\left(\frac{\text{in.}^2}{\text{sec.}(\#)^{1/2}}\right)$ $A_0$ = Orifice area (in.$^2$)

$P_0$ = normal pressure drop across orifice (constant) $\left(\frac{\#}{\text{in.}^2}\right)$ It is readily seen that the resistance value for an orifice is a non-linear function of the pressure amplitude. The relationship between pressure and flow ($Q$) is shown by the solid line curve in FIG. 2 representing the equation $Q=KA_0\sqrt{\Delta P}$ and where the slope of a line from the origin to the curve at any point is expressed by Equation 2, from which it will be seen that as pressure amplitude increases, incremental flow changes decrease. The dashed line in FIG. 2 depicts the approximation that is made for the characteristics when the foregoing resistance Equation 2 is used for an orifice, assuming a specific value for pressure differential ($\Delta P$).

A viscous or capillary resistance, on the other hand, is linear but is dependent upon oil viscosity which varies with temperature. The value of hydraulic resistance for a capillary tube is obtained from the following equation:

$$R = \frac{128\mu L}{\pi D^4} \quad (3)$$

where $R$ = hydraulic resistance $\left(\frac{\#\text{-sec.}}{\text{in.}^5}\right)$ $\mu$ = absolute viscosity $\left(\frac{\#\text{-sec.}}{\text{in.}^2}\right)$ $L$ = tube length (in.)

$D$ = internal diameter (in.)

The spring retained piston 52 forms a hydraulic capacitance which has the following value:

$$C = \frac{A^2}{K_s} \left(\frac{\text{in.}^5}{\#}\right) \quad (4)$$

where $C$ = hydraulic capacitance $\left(\frac{\text{in.}^5}{\#}\right)$ $A$ = piston area (in.$^2$)

$K_s$ = total spring rate $\left(\frac{\#}{\text{in.}}\right)$

The frequency at which the high frequency and low frequency amplitude asymptotes of the frequency response characteristic expressed by Equation 1 meet is known as the corner frequency ($fc$) and is defined by the reciprocal of the RC product, expressed by the following equation:

$$fc = \frac{1}{RC} = \frac{1}{\tau} \quad (5)$$

For the combination of a hydraulic capacitance and hydraulic resistance of the orifice type in such a filter, the corner frequency will vary with pressure amplitude due to the nonlinearity expressed by Equation 2.

Figure 4:
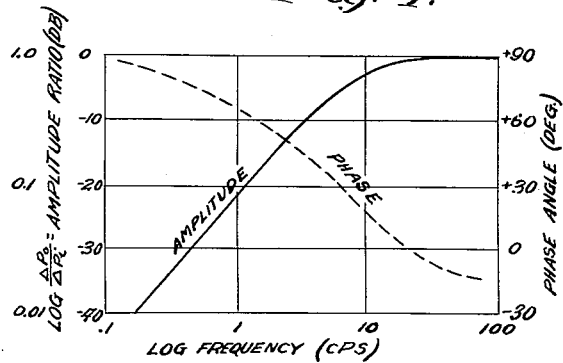
FIG. 4 is a curve depicting the measured relationship between amplitude ratio and frequency of oscillation of load pressure differential and thereby showing the gain of such typical frequency sensitive network, this figure also including a curve depicting the phase relationship between feedback pressure differential and load pressure differential for such a valve at varying frequencies.
Figure 3:
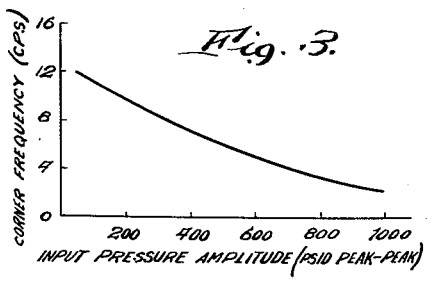
FIG. 3 is a curve depicting the corner frequency of a typical frequency sensitive network for a valve constructed in accordance with the principles of the present invention, when varying the amplitude of the load pressure differential oscillated at a given frequency.

The characteristics of a typical hydraulic high-pass filter network associated with an electrohydraulic valve are shown in FIGS. 3 and 4. The capacitance was formed by a .260 inch diameter piston and total spring rate of 500 lbs./in. to make, applying Equation 4

$$C = \frac{(.531)^2}{500} = 5.6 \times 10^{-6} \left(\frac{\text{in.}^5}{\#}\right)$$

The resistance was provided by an orifice having an area of 3.5×10⁻⁵ sq. in. and in applying Equation 2 consideration must be given to the fact that the pressure varied sinusoidally. Due to the non-linear resistance of the orifice, the 45° phase point which, as known by those skilled in the art, indicates the corner frequency for the network, changes with pressure amplitude. The relationship between corner frequency for various input pressure amplitudes is shown by the curve in FIG. 3. The input pressure amplitude is the difference peak to peak between the pressures in the load lines 20 and 21 of the valve. These pressures were varied sinusoidally at various frequencies and the frequency at which the output pressure differential in end chamber 13 and 13a was 45 degrees out of phase with the input pressure differential in load lines 20 and 21, indicating the corner frequency of the network, was detected and gives the plot in FIG. 3. Generally, it will be observed that the corner frequency decreases as the magnitude of the input pressure differential increases.

With a fixed input pressure differential of 450 p.s.i. peak to peak sinusoidally applied to the load lines 20 and 21 and hence exciting the filter network the elements of which had the specific values mentioned above, and varying the frequency of the excitation, the frequency response plotted in FIG. 4 resulted. In FIG. 4, the log of the amplitude ratio or the ratio of the output pressure differential $\Delta P_0$ to the input pressure differential $\Delta P_i$ (constant at 450 p.s.i. peak to peak) expressed in decibels is plotted as the left hand ordinate against the log of the frequency expressed in cycles per second of the input pressure differential as the abscissa. The phase angle between the input pressure differential and the output pressure differential is also plotted in FIG. 4 against log frequency. The phase angle expressed in degrees is the right hand ordinate in FIG. 4 and indicates the phase of the output or feedback pressure differential with respect to the input or load pressure differential.

Inspection of FIG. 4 shows that the filter network will not pass substantially full feedback pressures until the load or input pressure differential oscillates at a log frequency of about 10 c.p.s. At lower frequencies the load or input pressure differential has been partially filtered out, the lower the frequency the more effective the filtering. Thus, at such low frequencies, the valve with its filter network provides static stiffness and operates in the nature of a flow control valve in which valve spool displacement is proportionate only to the signal input current.

Above the cut off point of the filter network, that is, at log frequencies above about 10 c.p.s. in the example given above, the full effect of the feedback pressure differential is felt by the valve spool and the valve operates in the nature of a pressure-flow valve in which valve spool displacement is controlled jointly by the signal input current and the load pressure differential. When the frequency of oscillation of the load pressure differential is above the cut off point of the filter network, the spool end chamber 13 and load line 20 have the same pressure, and the other spool end chamber 13a and other load line 21 have the same pressure.

The piston head end faces 32 and 32a are of equal area, as are the spool end faces 30 and 30a although the faces 30, 30a are shown as larger in area than the faces 32, 32a.

Several forces act on the valve spool 23. Ignoring flow reaction forces, one is the command pressure, being the pressure differential acting on the spool end faces 30 and 30a and proportionate to the electrical input signal to the electrohydraulic amplifier first stage 34. A second force consists of the spring forces applied by the spool end springs 33 and 33a. A third force is the feedback pressure differential applied to the end faces 32 and 32a. The first force is opposed by the second and third forces. It will be seen essentially that for every command input, the valve spool 23 moves to reduce the summation of the above forces to zero.

The effect is that the functions of flow and pressure control combine to provide a valve characterized by having relatively high initial flow commanded by a given electrical signal input which is reduced to no flow as the pressure differential across the load is built up. By selecting the spool end areas 30, 30a, piston head areas 32, 32a, and the spring rate of the spool end springs 33, 33a, a valve can be designed to have the damping characteristic desired.

Reverting to the hydraulic filter network, it will be apparent that more than one hydraulic capacitance producing device or accumulator means such as the spring retained piston 52 may be employed in the network to provide the total hydraulic capacitance desired. Likewise, the total hydraulic resistance desired can be provided by more than one hydraulic resistance producing device or restrictor means such as the restricted orifice 51. Also, a number of other such combinations of resistance and capacitance elements could be devised by persons skilled in the art following the present teaching to perform the same frequency selective function.

It is to be noted that when the pressure differential across the load is not changing as sensed in the actuating ports 20 and 21, there is no fluid flow through the channels 56, 58, 59 and 60 and the pressure drop producing means 51 and with respect to the resiliently restrained fluid volume transfer means 52—55 associated therewith so that the frequency sensitive network is free of fluid flow during such steady state conditions.

Suitable fluid contamination filtering means may, of course, be incorporated in the hydraulic circuit of the present dynamic pressure feedback electrohydraulic servo valve at various places in order to maintain the hydraulic fluid free of foreign material. Such filtering means have not been illustrated herein in order to confine the disclosure to the essentials of the valve.

The present invention is applicable to electrically operated servo valves handling not only hydraulic liquid but other fluids, such as compressed air or hot gases. By the term "fluid" as used in the appended claims is meant either a liquid or gas.

Moreover, while the load pressure differential passed by the frequency sensitive network has been illustrated in the accompanying drawings and described hereinabove as operatively fed back to the valve spool, it is to be clearly understood that the present inventive concept in its broadest aspect contemplates any suitable feedback arrangement by which the effective fluid drive on the valve spool is reduced in response to the dynamic pressure differential in the actuating parts as a result of load reaction. For example, dynamic pressure feedback might be related to the flapper of the electrical force motor, rather than to the valve spool, in such a way as to work in opposition to the direction of displacement of the flapper induced by the electrical signal input. In both cases, the flapper moves to reduce to zero the summation of the various moments acting upon it, and likewise the valve spool moves to reduce to zero the summation of the various forces acting upon it. Accordingly, the embodiment of the invention shown and described is intended as illustrative only and not limitative of the invention which as to scope is to be measured by the appended claims.

What is claimed is:

1. In a servo valve, the combination comprising means providing actuating ports adapted to be connected to a fluid-operated load, a valve spool movable to control fluid flow through said ports, means providing driving chambers at opposite ends of said spool, means providing feedback chambers at opposite ends of said spool, a first stage electrohydraulic amplifier arranged to produce in said driving chambers a pressure differential output in response to an electrical input, and frequency sensitive load pressure feedback means operatively interposed between said ports and feedback chambers and including a first feedback channel connecting one of said feedback chambers to one of said ports, fluid accumulator means operatively arranged in said first feedback channel, a second feedback channel connecting the other of said feedback chambers directly to the other of said ports and fluid restrictor means operatively establishing fluid communication between said first feedback channel and said other of said ports.

2. In a servo valve having actuating ports adapted to be connected to a fluid-operated load, a first stage electrohydraulic amplifier and a second stage valve spool arranged to be fluidly driven by the output of said amplifier for controlling the flow of fluid through said ports, the combination therewith of load pressure feedback means associated with said ports and including resiliently restrained fluid volume transfer means and pressure drop producing means arranged to provide a frequency sensitive network for reducing the effective fluid drive on said spool in response to the dynamic pressure differential in said ports as a result of load reaction and operative to pass the load pressure variations more effectively above than below a predetermined frequency, said network being free of fluid flow during steady state conditions.

References Cited in the file of this patent

UNITED STATES PATENTS

| | | |
|---|---|---|
| 2,550,723 | Ross | May 1, 1951 |
| 2,647,493 | Whitehead et al. | Aug. 4, 1953 |
| 2,688,314 | Holm et al. | Sept. 7, 1954 |
| 2,698,517 | Witt | Jan. 4, 1955 |
| 2,756,725 | Parker | July 31, 1956 |
| 2,767,698 | Moog | Oct. 23, 1956 |

(Other references on following page)

UNITED STATES PATENTS

| | | | |
|---|---|---|---|
| 2,790,427 | Carson | Apr. 30, 1957 |
| 2,797,666 | Chubbuck | July 2, 1957 |
| 2,889,815 | Lloyd | June 9, 1959 |
| 2,909,195 | Keyt | Oct. 20, 1959 |
| 2,926,696 | Kolm | Mar. 1, 1960 |
| 2,931,343 | Moog | Apr. 5, 1960 |
| 2,939,430 | Westbury | June 7, 1960 |
| 2,972,338 | Lloyd | Feb. 21, 1961 |
| 3,064,627 | Blanton | Nov. 20, 1962 |